United States Patent
Lerbour et al.

(10) Patent No.: US 9,893,965 B2
(45) Date of Patent: Feb. 13, 2018

(54) METHOD OF GENERATING AN IMPROVED TRAFFIC MAP AND DEVICE UTILIZING SUCH A METHOD

(71) Applicant: INFOVISTA SAS, Massy OT (FR)

(72) Inventors: Regis Lerbour, Saint-Cyr-l'Ecole (FR); Yann Le Helloco, Ottawa (CA); Gregory Donnard, Aylmer (CA)

(73) Assignee: INFOVISTA SAS, Massy (FR)

( * ) Notice: Subject to any disclaimer, the term of this patent is extended or adjusted under 35 U.S.C. 154(b) by 0 days.

(21) Appl. No.: 14/534,687

(22) Filed: Nov. 6, 2014

(65) Prior Publication Data

US 2015/0126179 A1 May 7, 2015

(30) Foreign Application Priority Data

Nov. 7, 2013 (FR) ...................... 13 60924

(51) Int. Cl.
*H04L 12/26* (2006.01)
*H04W 4/02* (2009.01)
*H04W 24/10* (2009.01)
*H04W 16/22* (2009.01)

(52) U.S. Cl.
CPC ........ *H04L 43/062* (2013.01); *H04L 43/0876* (2013.01); *H04W 4/021* (2013.01); *H04W 16/22* (2013.01); *H04W 24/10* (2013.01)

(58) Field of Classification Search
CPC ............. G01C 21/3691; H04L 43/062; H04W 52/0232; H04W 84/18; H04W 16/22; H04W 24/10; H04W 4/021
See application file for complete search history.

(56) References Cited

U.S. PATENT DOCUMENTS

| 5,561,841 A | 10/1996 | Markus |
| 6,549,781 B1 | 4/2003 | O'Bryne et al. |
| 8,385,927 B2 | 2/2013 | Pfeiffer |
| 8,750,845 B2 * | 6/2014 | Iwuchukwu .......... H04L 67/325 345/419 |
| 9,171,464 B2 * | 10/2015 | Khetan ................ G08G 1/0962 |
| 2003/0040318 A1 | 2/2003 | Fattouch |
| 2007/0074288 A1 * | 3/2007 | Chang ................... H04L 43/028 726/22 |
| 2009/0094618 A1 * | 4/2009 | Huntsman ........... H04L 63/1408 719/318 |
| 2009/0143064 A1 | 6/2009 | Bernini |
| 2010/0178925 A1 | 7/2010 | Bernini |
| 2011/0160986 A1 * | 6/2011 | Wu ...................... G08G 1/0962 701/117 |
| 2011/0251790 A1 * | 10/2011 | Liotopoulos ....... G01C 21/3492 701/533 |

* cited by examiner

*Primary Examiner* — Liton Miah

(74) *Attorney, Agent, or Firm* — Greer, Burns & Crain, Ltd.

(57) ABSTRACT

A method is provided for generating a traffic map of an area covered by a cellular network including a plurality of antennas each managing a traffic and designed to communicate with a plurality of terminals generating events which are at least partially geolocatable, the covered area being discretized by pixels each associated, using probability, with one antenna of the plurality of antennas. The method includes, for each antenna, distributing a quantity of traffic managed by the antenna over the pixels, this distribution being weighted for each pixel as a function of the number and distance of the geolocatable events relative to the pixel.

8 Claims, 2 Drawing Sheets

METHOD OF GENERATING AN IMPROVED TRAFFIC MAP AND DEVICE UTILIZING SUCH A METHOD

BACKGROUND

The field of the invention is the planning and optimization of cellular networks and more precisely the generation of a traffic map.

Within the field of the invention, the notion of traffic is dominant. In fact, whether for evaluating the state of a cellular network through simulations (i.e. planning it) or for configuring it so that it functions optimally with respect to a number of predefined criteria (i.e. optimizing it), it is essential to know how much traffic is to be provided.

It is at least as important to know the distribution of this quantity of traffic in a geographical area covered by the network as to know the quantity of traffic to be provided in this area. In fact, the planning and optimization of a network change according to the position of high-traffic zones called "hotspots".

As a result, the tools for planning and optimizing cellular networks use "traffic maps". These traffic maps are constituted by pixels. A pixel represents a discretization of a sub-area of the area of the network. The traffic map associates a value, an expected traffic density, with each of these pixels. This value in general corresponds to the times in the day and in the week during which the quantity of traffic is greatest. Thus, the network is planned in every pixel for the most extreme traffic conditions. The more accurate these maps are, for example the smaller the sub-areas are, the more accurate and faithful to the reality of observations made on the ground the planning and, a fortiori, the optimization of the network in this area are.

However, telecommunication operators do not have direct access to this type of map because they only know the quantity of traffic managed by antennas operated by them, without knowing the exact origin of this traffic in the coverage zones of these antennas.

Radio planning tools are known which make it possible to generate traffic maps for an area of a cellular network from the knowledge of the quantity of traffic collected by each antenna covering at least part of this area. These tools utilize methods that use geographical maps covering the area for which a traffic map will be generated. These methods generally comprise a step of discretizing the area by tiling elements of this area, called pixels, followed by two steps:

a step of associating each pixel with an antenna of the cellular network;

using a geographical map that divides this area according to parcel types, for example rural, road, water, urban, densely urban, and allocating to each parcel type a weighting as a function of the probability that the parcel type is associated with a high traffic density.

Thus, each pixel of this map is associated with a parcel weighting of the quantity of traffic managed by one of the antennas of the cellular network.

Interestingly, the coverage zone of each antenna is automatically calculated by these planning methods, which estimate the received power at each geographical point coming from each antenna of the network.

In general, the parcel weighting is determined by the telecommunications operator.

The methods utilized by these tools then distribute the traffic captured by each antenna over the coverage zone of this antenna according to the parcel weighting.

One limitation of these methods of generating a traffic map is the accuracy of the map generated. In fact, it cannot be more accurate than the accuracy provided by the geographical map.

The aim of the invention is to propose a generation of a traffic map that is more accurate than the traffic maps currently generated by the known tools.

SUMMARY

The invention makes it possible to achieve at least this aim by proposing a method of generating a traffic map of an area covered by a cellular network comprising a plurality of antennas $A_j$ each managing a traffic $TR_j$ and designed to communicate with a plurality of terminals that generate events U which are at least partially geolocatable, the area covered being discretized by pixels $P_k$ each associated, using probability, with one antenna of the plurality of antennas $A_i$, the method comprising, for each antenna $A_j$, distributing a quantity of traffic $TR_j$ managed by the antenna $A_j$ over the pixels $P_k$, this distribution being weighted for each pixel $P_k$ as a function of the number and distance of the geolocatable events relative to said pixel $P_k$.

Thus, the method according to the invention proposes a more accurate generation of a traffic map than the traffic maps currently generated by the known tools, thanks to the use of geolocatable events to distribute dynamically the traffic $TR_j$ managed by an antenna.

Preferably, the method according to the invention moreover comprises, for at least one of the pixels $P_k$, determining or estimating the distance separating the pixel $P_k$ from at least some of the geolocatable events U and determining a weighting $X_k$, called a global weighting, resulting from a function f, called an importance function, and determining a weighting $E_k$, called a utility weighting, the weighting $E_k$ being a function of the number and distance of the geolocatable events relative to said pixel $P_k$, associating the weighting $X_k$ with said pixel $P_k$, and a step of distributing the quantity of traffic $TR_j$ managed by the antenna $A_j$ over the totality of the pixels P.

The association of the determination of the global weighting $X_k$ resulting from the importance function f of the utility weighting $E_k$ with pixels $P_k$ makes it possible to distribute a quantity of traffic over the totality of the pixels P while controlling the importance of the contribution of the geolocatable events to the generation of the traffic map.

Advantageously, an event can be generated by an application of one of the terminals using a GPS (geolocation device) integrated in the terminal, the step of geolocating this event comprising requesting interrogation of a service to determine the geolocation of this event.

Thus, when a user of the terminal comprising a GPS generates an event comprising a geolocation of the terminal, the telecommunications operator can interrogate a service likely to have received the event via a request to determine the geolocation of the event.

Preferably, the event generates a receiving by the operator of data generated by the terminal emitting the event relating to the level of reception from at least one of the operator's antennas, the geolocation step comprising an analysis of the data. Thus, the operator can geolocate the terminal emitting the event.

For example, when an antenna is quite directional, the geolocation of an emitting terminal from an estimation of the power level received by this antenna after emission by the emitting terminal is possible.

Another way of determining the geolocation of an emitting terminal is to know its distance from the antenna and an estimation of the power level received by this antenna after emission by the emitting terminal. Knowing the distance from the antenna makes it possible to position the emitting terminal on the circle centered on the antenna and with a radius equal to the distance. The power level received by the antenna makes it possible to determine, optionally using geographical data, the position of the emitting terminal. For example, when three points of the circle centered on the antenna are likely to be positions of the emitting terminal, knowing additional geographical data can make it possible to determine the position of the emitting terminal: this is the case when two of the points are located geographically in an unlikely or impossible place (such as for example the middle of a lake).

More preferably, the event generates a receiving by the operator of data generated by the terminal emitting the event relating to the level of reception from at least three of the operator's antennas, the geolocation step comprising an analysis of the data. Thus, the operator can geolocate the terminal emitting the event using these data, for example by triangulation.

Advantageously, the step of determining the global weighting Xk can moreover comprise a step of determining a weighting Wk, called a parcel weighting, as a function of a parcel type associated with the pixel Pk, the parcel type being determined by a geographical map dividing the area covered by the cellular network according to parcel types. The parcel weighting Wk makes it possible to use data resulting from the use of a geographical map.

In the case where the determination of the global weighting Xk comprises the step of determining the parcel weighting Wk, the step of determining the global weighting Xk can moreover comprise, after the step of determining the parcel weighting Wk, selecting an importance function f to allocate a greater importance to the weighting Ek compared with the weighting Wk.

In the case where the determination of the global weighting Xk comprises the step of determining the parcel weighting Wk, the step of determining the global weighting Xk can moreover comprise, after the step of determining the parcel weighting Wk, selecting an importance function f to allocate a greater importance to the weighting Wk compared with the weighting Ek.

According to another aspect of the invention, a device is proposed for generating a traffic map of an area covered by a cellular network comprising a plurality of antennas Aj each managing a traffic TRj and designed to communicate with a plurality of terminals that generate events U which are at least partially geolocatable, the area covered being discretized by pixels Pk each associated, using probability, with one antenna of the plurality of antennas Ai, the device being designed to generate, for each antenna Aj, a distribution of a quantity of traffic TRj managed by the antenna Aj over the pixels Pk, this distribution being weighted for each pixel Pk as a function of the number and distance of the geolocatable events relative to said pixel Pk.

BRIEF DESCRIPTION OF THE DRAWINGS

Other advantages and features of the invention will become apparent on reading the detailed description of implementations and embodiments which are in no way limitative, and from the following attached drawings.

DETAILED DESCRIPTION

As these embodiments are in no way limitative, it will be possible to consider, in particular, variants of the invention comprising only a selection of the features described below in isolation from the other described features (even if this selection is taken in isolation from a sentence including these other features), if this selection of features is sufficient to confer a technical advantage or to differentiate the invention with respect to the state of the prior art. This selection comprises at least one preferably functional feature without structural details, or with only a part of the structural details if this part alone is sufficient to confer a technical advantage or to differentiate the invention with respect to the state of the prior art.

In the figures, the elements appearing in several figures keep the same references.

Figure 1:
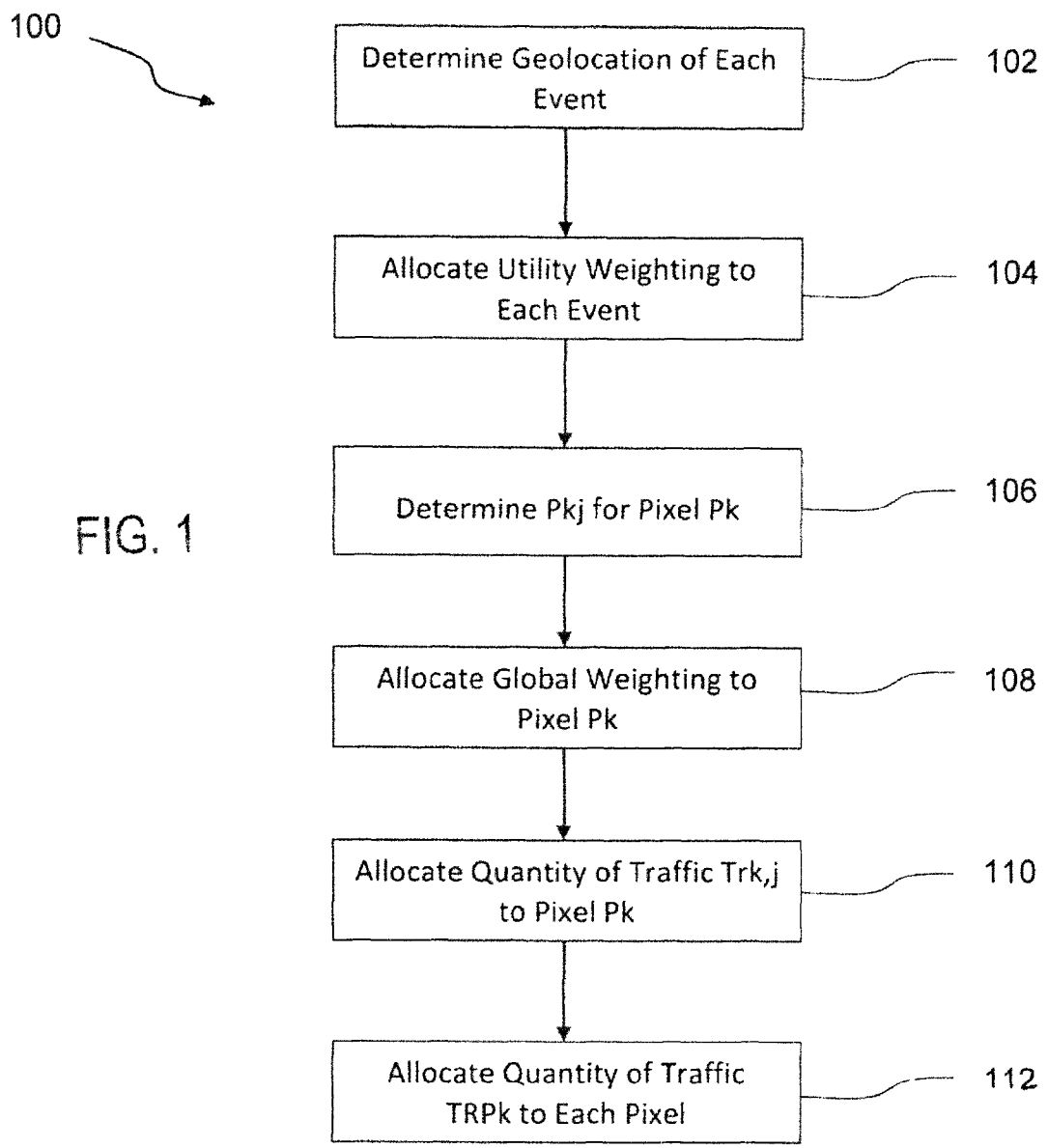
FIG. 1 is a diagrammatic representation of a first embodiment of a method according to the invention.

FIG. 1 shows a first method 100 of generating a traffic map according to the invention. This method is utilized by a cellular network operated by a telecommunications operator comprising a plurality of antennas, the totality of which is denoted A. The area covered by the antennas constituting the totality A is denoted E(A). The coverage zone of an antenna A in the area covered by the antennas is denoted C(A).

The area E(A) is discretized in the form of pixels, the totality of which is denoted P.

Each antenna Aj manages a traffic denoted TRj and is designed to communicate with a plurality of terminals. The totality of the terminals is denoted T.

The terminals T generate a totality of events U. The sub-set of the geolocatable events of the totality U is denoted G(U).

During step 102, the geolocation of each event belonging to G(U) is determined. The geolocation of the events is described below.

During a step 104, a weighting Ek, called a utility weighting, resulting from a function φ of the number and distance of the events relative to the pixel Pk is associated with each pixel Pk. In the embodiment described here of the method according to the invention:

$$Ek = \sum_{Ul \in G(U)} \varphi(d(Ul, Pk))$$

where d(Ul, Pk) is the distance between the event Ul and the pixel Pk and φ is a function of this distance.

In the embodiment described here of the method according to the invention, the function φ is the reduced centered normal distribution, also called Gaussian. In other words:

$$\varphi(t) = \frac{1}{\sqrt{2\pi}} e^{-\frac{1}{2}t^2}$$

The advantage of choosing such a function φ is to allocate to an event a utility weighting that is weaker at an event Ul as its distance from the pixel Pk is greater.

Thus the utility weighting Ek is the sum of the distances of the events belonging to G(U) from the pixel Pk, each distance being weighted by how far away it is from the pixel Pk according to the Gaussian function.

During an optional step 106, the probability Pkj of a pixel Pk being in the coverage zone of an antenna Aj of the totality A is determined for each pixel Pk. The probability Pkj that a pixel Pk is in the coverage zone of the antenna is close to 1 when the pixel Pk is close to the antenna Aj, and close to 0 when the pixel is far away from the antenna Aj.

Given a pixel Pk, the method according to the invention determines the reception power of the antennas. The two antennas with the highest determined reception powers are denoted Aj1 and Aj2 and their reception powers at the level of the pixel Pk are denoted puk1 and puk2 respectively, and:
for Aj1, Pkj1=(1/puk1)/[(1/puk1)+(1/puk2)],
for Aj2, Pkj2=(1/puk2)/[(1/puk1)+(1/puk2)] and
Pkl=0 for any antenna Al other than Aj1 and Aj2.

In an embodiment variant, Pkj=1 can be chosen if Aj is the antenna with the strongest estimation of the received power level, otherwise Pkj=0.

During a step 108, a second weighting Xk, called the global weighting, is allocated to a pixel Pk. In this first embodiment, the weight Xk is equal to the weight Ek:Xk=Ek.

During a step 110, a quantity of traffic Trk,j which is an estimate of the quantity of traffic generated by the pixel Pk for the antenna Aj is allocated to a pixel Pk. The estimate Trk,j of the quantity of traffic generated by the pixel Pk for the antenna Aj is calculated in this way:

$$TR_{kj} = \frac{XkPkj}{\sum_{Pl \in P} XlPlj} TR_j$$

For this step 110 it can be verified that, in the embodiment variant for which Pkj=1 if the pixel Pk is the closest to the antenna Aj and otherwise 0, it is found that:

$$TR_{kj} = \frac{Xk}{\sum_{Pl \in C(j)} Xl} TR_j$$

During a step 112, a quantity of traffic TRPk which is an estimate of the total traffic generated by the pixel Pk for the totality of the operator's antennas is allocated to a pixel Pk:

$$TRP_k = \sum_{Aj \in A} TR_{kj} = \sum_{Aj \in A} \frac{XkPkj}{\sum_{Pl \in P} XlPlj} TR_j$$

Knowing the quantity of traffic TRPk for each pixel makes it possible to generate a traffic map of the area covered by the telecommunications operator by associating the quantity TRPk with each pixel Pk.

A second embodiment of the invention will now be described solely with respect to its differences from the first embodiment.

In this second embodiment, during step 108 a geographical map covering the area E(A) and dividing this area according to parcel types, for example rural, road, water, urban, densely urban, and an allocation of a weighting W to each parcel type are utilized. Thus, a parcel weighting Wk is allocated to each pixel Pk depending on the parcel type in which the pixel Pk is located.

In this second embodiment, the second weight Xk is allocated as a function of the weights Ek and Wk according to a function called the importance function, denoted f:

$$Xk = f(Ek, Wk)$$

It is envisaged for example, in this second embodiment, to use the following as importance function:
either a simple average of Wk and Ek, Xk=(Wk+Ek)/2,
or a weighted average (for example if the operator has more confidence in the accuracy of the geolocated events Ek than in the parcel weightings linked to the terrain Wk, Xk=(Wk+2*Ek)/3) can be chosen In a third embodiment of the method according to the invention described solely with respect to its differences from the first two embodiments, the step 106 is carried out upstream of the method of generating the traffic map. Thus, the step 106 is optional and is not necessarily carried out by the method according to the invention.

Figure 2:
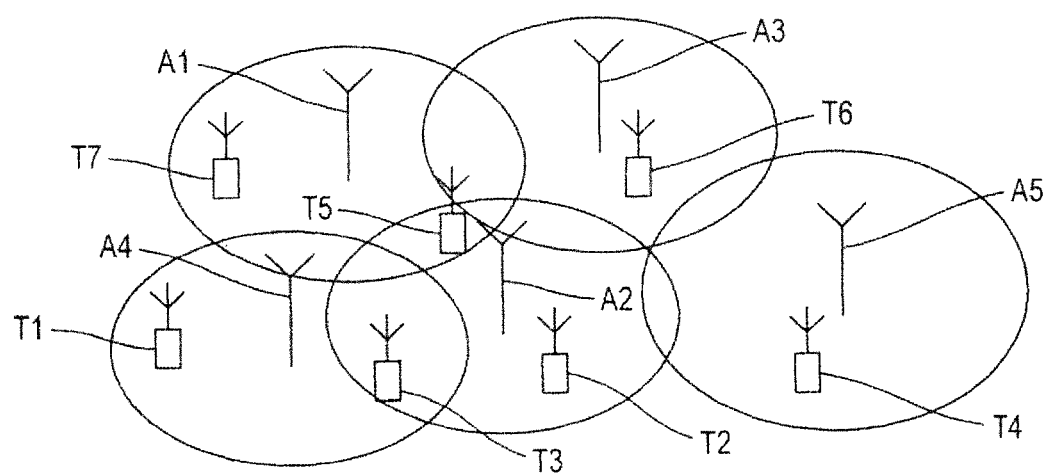
FIG. 2 is a diagrammatic representation of an implementation of a device according to the invention.

FIG. 2 shows the operator's network comprising the antennas A1, A2, A3, A4, A5 forming part of the totality of antennas A as well as terminals T1, T2, T3, T4, T5, T6, T7 forming part of the totality of terminals T.

A first method of determining the geolocation of an event Ul, utilized in step 102, will now be described in more detail. When an event Ul is generated by a terminal Tm, the terminal Tm also emits the different levels of reception power of the antennas surrounding it.

Thus, the step 102 comprises exploiting the different levels of reception power of the antennas surrounding the terminal Tm that is emitting the event Ul. The analysis of these different levels of reception power makes it possible to geolocate the terminal Tm. Several well-known techniques can be utilized. In this first determination step, a triangulation technique is envisaged.

In a variant of this first determination step, but able to be used in addition, a second step of determining the geolocation of an event Ul, utilized in step 102, will now be described. When an event Ul is generated by a terminal Tm and in certain cases, the terminal Tm also emits its GPS position destined for certain internet services, such as social networks. Certain social networks, such as Twitter, make it possible to know the geolocation of the terminal emitting the event Ul. Other social networks could allow their databases to be interrogated to determine the geolocation of the event generated by the terminal.

Thus, the step 102 comprises interrogating an internet service to determine the geolocation of the event Ul generated by a terminal Tm having previously informed the internet service of its position, this position being known by the terminal Tm thanks to a GPS integrated in the terminal Tm.

Of course, the invention is not limited to the examples which have just been described and numerous adjustments can be made to these examples without exceeding the scope of the invention.

The invention claimed is:

1. A method of generating a traffic map of an area covered by a cellular network including a plurality of antennas Aj, each of the plurality of antennas managing a traffic TRj and designed to communicate with a plurality of terminals, the method comprising:
generating geolocatable events U by the plurality of terminals, said covered area being discretized by pixels Pk each associated, using probability, with one antenna of said plurality of the antennas $A_j$;

generating a geolocation of each of the plurality of terminals based on said geolocatable events generated by the plurality of terminals; and distributing, for each said antenna Aj, a quantity of traffic TRj managed by said antenna Aj over said pixels Pk, this distribution being weighted for each pixel Pk as a function of the number and distance of said geolocatable events relative to said pixel Pk based on said geolocation associated with each of the plurality of terminals.

2. The method according to claim 1, further comprising determining, for at least one of said pixels Pk, the distance separating said pixel Pk from at least some of the geolocatable events U;

determining a weighting Xk, called a global weighting, resulting from an importance function f, and determining a weighting Ek, called a utility weighting, the weighting Ek being a function of the number and distance of the geolocatable events relative to said pixel Pk, associating the weighting Xk with said pixel Pk, and distributing the quantity of traffic TRj managed by the antenna Aj over the totality of the pixels P.

3. The method according to claim 1, wherein an event is generated by an application of one of said terminals using a GPS (geolocation device) integrated in said terminal, the step of geolocating this event comprising requesting interrogation of a service to determine the geolocation of this event.

4. The method according to claim 1, wherein the event generates a receiving by the operator of data generated by the terminal emitting the event relating to the level of reception from at least one of the operator's antennas, the geolocation step comprising an analysis of said data.

5. The method according to claim 1, wherein the step of determining the global weighting Xk moreover comprises a step of determining a weighting Wk, called a parcel weighting, as a function of a parcel type associated with the pixel Pk, said parcel type being determined by a geographical map dividing the area covered by the cellular network according to parcel types.

6. The method according to claim 5, wherein the step of determining the global weighting Xk moreover comprises, after the step of determining the parcel weighting Wk, selecting an importance function f to allocate a greater importance to the weighting Ek compared with the weighting Wk.

7. The method according to claim 5, wherein the step of determining the global weighting Xk moreover comprises, after the step of determining the parcel weighting Wk, selecting an importance function f to allocate a greater importance to the weighting Wk compared with the weighting Ek.

8. A device for generating a traffic map of an area covered by a cellular network including a plurality of antennas Aj, each of the plurality of antennas managing a traffic TRj, the device comprising:

a plurality of terminals in communication with the plurality of antennas, said plurality of terminals each having a geolocation and generating geolocatable events U, said covered area being discretized by pixels Pk, each of the pixels being associated, using probability, with one antenna of said plurality of antennas $A_j$; and a quantity of traffic TRj generated for each antenna Aj, a distribution of said quantity of traffic TRj managed by said antenna Aj over said pixels Pk, this distribution being weighted for each pixel Pk as a function of the number and distance of said geolocatable events relative to said pixel Pk based on said geolocation associated with each of said plurality of terminals.

* * * * *